(12) United States Patent
Kimura

(10) Patent No.: US 8,736,918 B2
(45) Date of Patent: May 27, 2014

(54) OVERHEAD SCANNER

(75) Inventor: Keisuke Kimura, Ishikawa (JP)

(73) Assignee: PFU Limited, Ishikawa (JP)

( * ) Notice: Subject to any disclaimer, the term of this patent is extended or adjusted under 35 U.S.C. 154(b) by 42 days.

(21) Appl. No.: 13/464,742

(22) Filed: May 4, 2012

(65) Prior Publication Data

US 2012/0320432 A1    Dec. 20, 2012

(30) Foreign Application Priority Data

Jun. 15, 2011    (JP) .................................. 2011-133599

(51) Int. Cl.
*H04N 1/04* (2006.01)

(52) U.S. Cl.
USPC ............................ 358/474; 358/497; 358/486

(58) Field of Classification Search
CPC . H04N 1/04; H04N 19/00109; H04N 101/00; H04N 2201/0436; H04N 1/02815; H04N 2201/00; H04N 2213/00
USPC .................. 358/474, 486, 496, 497
See application file for complete search history.

(56) References Cited

U.S. PATENT DOCUMENTS

| | | | |
|---|---|---|---|
| 5,625,183 A * | 4/1997 | Kashitani et al. ............. | 250/236 |
| 5,760,925 A * | 6/1998 | Saund et al. ................. | 358/497 |
| 5,764,383 A * | 6/1998 | Saund et al. ................. | 358/497 |
| 5,818,612 A * | 10/1998 | Segawa et al. ............... | 358/494 |
| 5,835,241 A * | 11/1998 | Saund ........................... | 358/488 |
| 5,978,102 A | 11/1999 | Matsuda | |
| 6,325,288 B1 * | 12/2001 | Spitz ....................... | 235/462.12 |
| 6,614,564 B1 * | 9/2003 | Sakaguchi .................... | 358/487 |
| 6,738,166 B1 | 5/2004 | Kano et al. | |
| 6,771,394 B1 | 8/2004 | Nakanishi et al. | |
| 6,963,428 B1 * | 11/2005 | Gann .............................. | 358/474 |
| 6,965,460 B1 * | 11/2005 | Gann et al. ..................... | 358/471 |
| 7,731,662 B2 * | 6/2010 | Anderson et al. ............. | 600/459 |
| 8,137,010 B2 * | 3/2012 | Yoshida et al. ............... | 396/428 |
| 8,503,045 B2 * | 8/2013 | Kubo et al. .................... | 358/474 |
| 8,537,416 B2 * | 9/2013 | Sandstrom et al. ............ | 358/1.8 |
| 8,559,071 B2 * | 10/2013 | Kawata ......................... | 358/474 |

FOREIGN PATENT DOCUMENTS

JP    2001-028671    1/2001

OTHER PUBLICATIONS

United States Office Action issued in U.S. Appl. No. 13/111,498 dated Aug. 21, 2013.
United States Office Action issued in U.S. Appl. No. 13/369,035 dated Jul. 26, 2013.

* cited by examiner

*Primary Examiner* — Negussie Worku
(74) *Attorney, Agent, or Firm* — McDermott Will & Emery LLP

(57) ABSTRACT

An overhead scanner includes a main body, a rotation unit supported by the main body and being rotatable around a rotation axis, an imaging unit mounted on the rotation unit and is configured to read a medium placed on a placement surface below the rotation unit, a light source that irradiates the medium with light, a driving unit that moves the rotation unit around the rotation axis toward a placement side, where the medium is placed, and a posture change detecting unit that detects posture change of the main body. When it is determined that the main body falls down based on the posture change detected, while the rotation unit is located at a readable position for reading the medium, the driving unit moves the rotation unit toward the standby position where the rotation unit is located when the imaging unit does not read the medium.

6 Claims, 11 Drawing Sheets

OVERHEAD SCANNER

CROSS-REFERENCE TO RELATED APPLICATIONS

This application is based upon and claims the benefit of priority from Japanese Patent Application No. 2011-133599, filed on Jun. 15, 2011, the entire contents of which are incorporated herein by reference.

BACKGROUND OF THE INVENTION

1. Field of the Invention

The present invention relates to an overhead scanner.

2. Description of the Related Art

Overhead scanners have been known that read a medium to be read from the upper side in the vertical direction. For example, Japanese Patent Application Laid-open No. 2001-028671 discloses an image-reading apparatus including a stand having a support arm, scanning lighting means for irradiating a surface of a document with a light beam like one emitted through a slit, hereinafter referred to as a slit-light beam, and document-image reading means provided on an upper portion of the support arm for reading a document image by the light beam reflected from the document surface.

When the overhead scanner that reads a medium to be read from the upper side in the vertical direction falls down, an optical system thereof including an imaging unit and a light source may receive shock. For example, when an overhead scanner having a movable optical system falls down while reading a medium to be read, the optical system may come into direct contact with a placement surface and the like. It has been desired to protect the optical system when the overhead scanner falls down.

SUMMARY OF THE INVENTION

It is an object of the present invention to at least partially solve the problems in the conventional technology.

According to an aspect of the present invention, an overhead scanner comprises a main body, a rotation unit supported by the main body so as to be rotatable around a rotation axis, an imaging unit that is mounted on the rotation unit and is configured to read a medium to be read that is placed on a placement surface located below the rotation unit in a vertical direction, a light source that irradiates the medium to be read with light, a driving unit that moves the rotation unit around the rotation axis toward a placement side, on which the medium to be read is placed, and a posture change detecting unit that detects posture change of the main body. A standby position where the rotation unit is located when the imaging unit does not read the medium to be read, is located in an opposite direction to a direction toward the placement side. While the rotation unit is located at a readable position where the imaging unit is capable of reading the medium to be read, and when it is determined that the main body falls down based on the posture change of the main body, the driving unit moves the rotation unit toward the standby position around the rotation axis.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

An overhead scanner according to an embodiment of the invention is explained in detail below with reference to the accompanying drawings. The embodiment does not limit the invention. The elements of the following embodiment include elements that the persons skilled in the art can easily assume or that are substantially the same as the elements known by those in the art.

Figure 1:
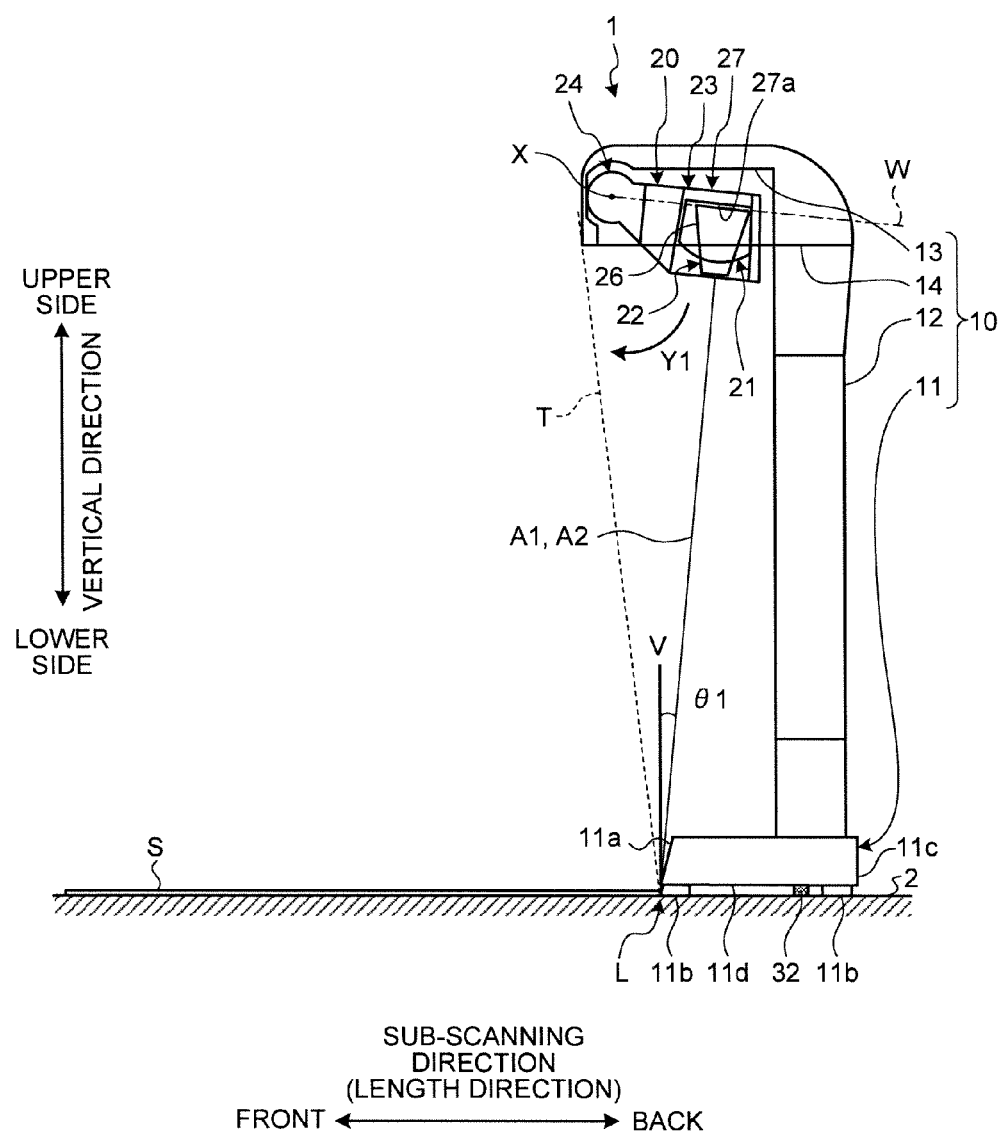
FIG. 1 is a side view of an overhead scanner according to an embodiment.
Figure 2:
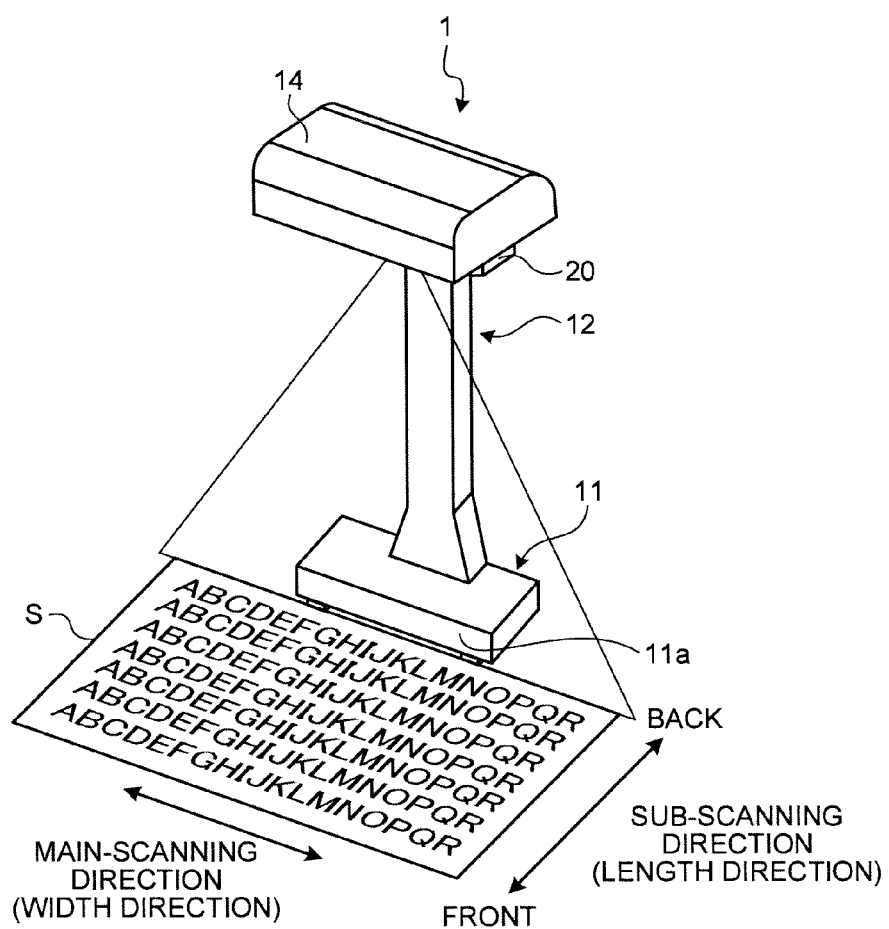
FIG. 2 is a perspective view of the overhead scanner according to the embodiment.
Figure 3:
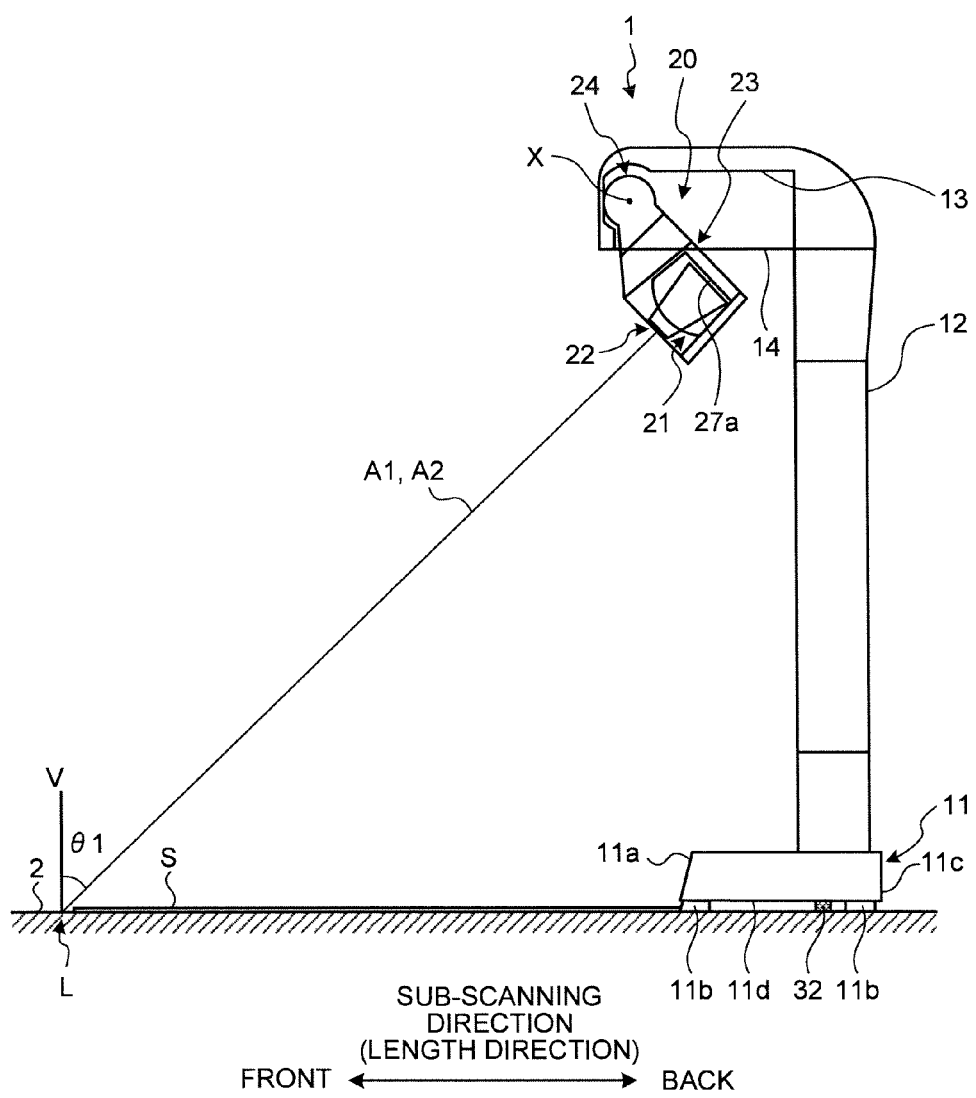
FIG. 3 is a side view of the overhead scanner located at the front-end reading position.
Figure 4:
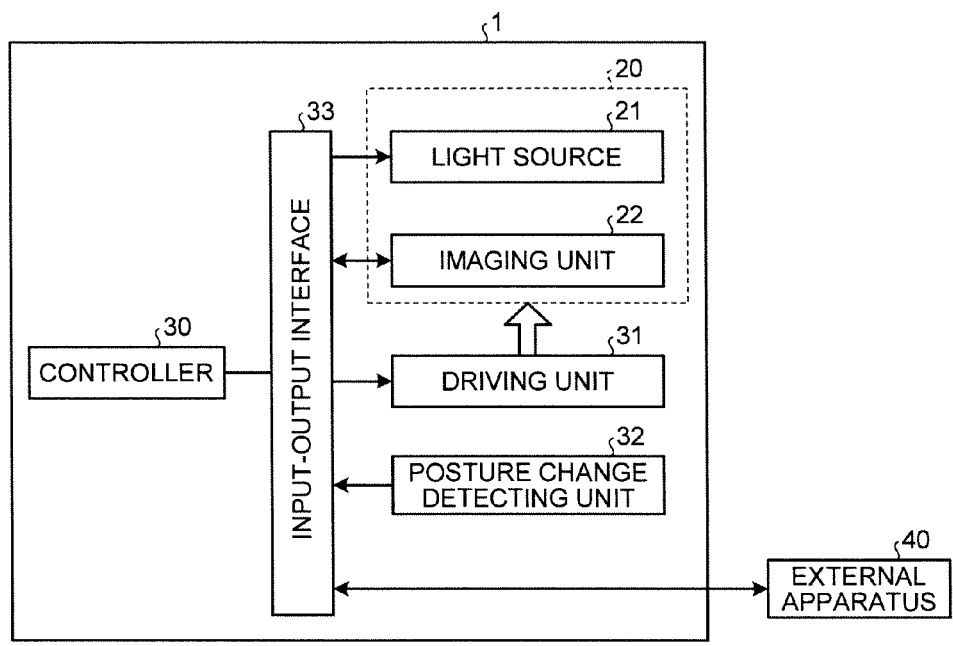
FIG. 4 is a block diagram of the overhead scanner according to the embodiment.

An embodiment is explained with reference to FIGS. 1 to 7. The embodiment relates to an overhead scanner. FIG. 1 is a side view of an overhead scanner according to the embodiment. FIG. 2 is a perspective view of the overhead scanner according to the embodiment. FIG. 3 is a side view of the overhead scanner located at the front-end reading position. FIG. 4 is a block diagram of the overhead scanner according to the embodiment.

An overhead scanner 1, shown in FIGS. 1 and 2, is an image-reading apparatus that reads a medium S to be read from the upper side in the vertical direction. As shown in FIG. 1, the overhead scanner 1 includes a main body 10 and an optical unit 20. The overhead scanner 1 can read an image of the medium S to be read that is placed on a placement surface 2 located under the optical unit 20 in the vertical direction. The placement surface 2 is, for example, a flat surface such as a top surface of a desk.

The main body 10 includes a pedestal 11, an arm 12, a supporter 13, and a cover 14. The pedestal 11 is placed on the placement surface 2, for example, and supports the whole of the main body 10 as a base of the main body 10. Operation members such as a power source switch and an image-reading start switch of the overhead scanner 1 are arranged on the pedestal 11, for example. The pedestal 11 has a flat shape, for example, and is placed such that a bottom surface 11*d* thereof and the placement surface 2 face each other. The bottom surface 11*d* of the pedestal 11 has legs 11*b* thereon. The legs 11*b* are disposed at four corners on the bottom surface 11*d* of the pedestal 11 so as to support the pedestal 11.

The pedestal 11 of the embodiment has a flat rectangular parallelepiped shape, or a similar or resembling shape thereof. The length in the vertical direction is smaller than both of the length in the width direction (a main-scanning direction, which is described later) and the length in the length direction (a sub-scanning direction, which is described later). The pedestal 11 may be shaped such that the length in the width direction is longer than the length in the length direction.

The medium S to be read is placed such that a side thereof abuts on a front surface 11a that is one of four side surfaces of the pedestal 11. For example, the medium S to be read is placed so as to abut on two of the legs 11b each of which is disposed on the bottom surface 11d at respective one of two corners adjacent to the front surface 11a among the four corners (also referred to as the front surface 11a side). That is, the medium S to be read is placed on the placement surface 2 such that a side thereof is parallel to the front surface 11a. In the embodiment, when the medium S to be read having a rectangular shape is placed such that a side thereof abuts on the front surface 11a, in the medium S to be read, a direction parallel to the side abutting on the front surface 11a is defined as the "width direction" or the "main-scanning direction", and a direction parallel to a side perpendicular to the side, abutting on the front surface 11a side is defined as the "length direction" or the "sub-scanning direction". The length direction is also defined as a direction where a user is opposite the overhead scanner 1 when the user faces the overhead scanner 1 interposing the medium S to be read between the user and the overhead scanner. In the length direction, a direction heading from a back surface 11c to the front surface 11a is defined as the front while a direction heading from the front surface 11a to the back surface 11c is defined as the back. The back surface 11c and the front surface 11a are opposite to each other in the length direction out of four side surfaces of the pedestal 11.

The arm 12 is connected to the pedestal 11 and extends upward in the vertical direction from the pedestal 11. The arm 12 is formed into a pillar or a pipe both having, for example, a rectangular cross section. The arm 12 has slopes at lower portion thereof where cross-section of the arm 12 gradually increases as it extends downward (toward the lower side) in the vertical direction. More specifically, the length in the width direction of the lower portion of the arm 12 increases as the arm 12 extends toward the lower side in the vertical direction. The arm 12 is connected to an upper surface of the pedestal 11 at one of sides of the upper surface. Specifically, the arm 12 is connected to the upper surface of the pedestal 11 at a side opposite to a side where the medium S to be read is placed, out of four sides forming edges of the upper surface. In other words, the arm 12 is connected to an end of the pedestal 11 which is adjacent to the back surface 11c that is remote from the medium S to be read. The arm 12 is connected to a central portion of the pedestal 11 in the width direction.

The supporter 13 is connected to the arm 12 at an upper end thereof in the vertical direction. The supporter 13 protrudes forward in the sub-scanning direction from the upper end of the arm 12. The supporter 13 protrudes toward both sides in the width direction from the upper end of the arm 12. That is, the supporter 13 protrudes from the arm 12 toward a placement side which is a side to face the placement surface 2 on which the medium S to be read is placed (also referred to as a medium S side) and toward both sides in the width direction.

The pedestal 11 and the supporter 13 face each other in the vertical direction. An end of the pedestal 11 located on a side opposite to the medium S side in the length direction, and an end of the supporter 13 on the side opposite to the medium S side in the length direction are connected with the arm 12. The supporter 13 protrudes forward in the length direction beyond the pedestal 11. That is, a front edge of the supporter 13 is located more forward than a front edge of the pedestal 11. As a result, at least a part of the supporter 13 and the medium S to be read face each other in the vertical direction when the medium S is placed on the placement surface 2 so as to abut on the pedestal 11.

The cover 14 is mounted on a rotation axis X of the optical unit 20 and covers the supporter 13 and the optical unit 20. The cover 14 covers the rotation axis X, the supporter 13, and the optical unit 20 from the upper side in the vertical direction. The cover 14 forms an outer shell of an upper portion of the main body which includes the supporter 13 and the optical unit 20. The cover 14 may be integrally formed with the supporter 13. The optical unit 20 may be supported by the cover 14 on the main body 10 so as to be rotatable around the rotation axis X.

In the embodiment, the term "radial direction" means a radial direction perpendicular to the rotation axis X unless otherwise described. In addition, the term "axial direction view" means a view when viewed in an axial direction of the rotation axis X unless otherwise described, in the specification.

The optical unit 20 is a rotation unit that can rotate around the rotation axis X with respect to the main body 10. The rotation axis X extends straight in the width direction, i.e., in a direction parallel to the front surface 11a. That is, the rotation axis X is perpendicular to a vertical axis V. The vertical axis V coincides with the normal line of the placement surface 2. The optical unit 20 includes a light source 21, an imaging unit 22, a main body 23, and an axis unit 24. The axis unit 24 has a columnar shape and is supported by the supporter 13 rotatably around the rotation axis X with a bearing, for example, interposed between the axis unit 24 and the supporter 13. The rotation axis X is located at a position projected toward the placement side with respect to the pedestal 11 from the upper end in the vertical direction of the arm 12 because the axis unit 24 is supported by the supporter 13. The main body 23 is connected to the axis unit 24 and locates outside of the axis unit 24 in the radial direction of the rotation axis X. For example, the main body 23 is a hollow material having a rectangular cross section in the axial direction view. The light source 21 and the imaging unit 22 are mounted inside the main body 23.

The supporter 13 is provided with a driving unit (refer to symbol 31 in FIG. 4). The driving unit 31 can swing the optical unit 20 around the rotation axis X by applying driving force to the optical unit 20 to move the optical unit 20 around the rotation axis X. The driving unit 31 includes an electric motor, and a transmission unit that connects a rotation axis of the motor and the optical unit 20, for example. The motor is a stepping motor, for example, and can control a rotational angle of the optical unit 20 with high accuracy. The transmission unit includes a combination of pulleys, belts, and worm gears, for example. The transmission unit reduces the rotation of the motor and transmits the rotation reduced to the optical unit 20.

The light source 21 includes a light emitting unit such as a light-emitting diode (LED) and can irradiate the medium S to be read with light from the upper side in the vertical direction. The light source 21 has a function of irradiating the medium S to be read with the slit-light beam and, for example, has a lens capable of emitting the slit-light beam. The light source 21 may have a plurality of lighting modules each having a light emitting unit and a lens. For example, the lighting modules may be disposed on both sides of the imaging unit 22 in the main-scanning direction.

As shown in FIG. 1, the light source 21 and the imaging unit 22 are arranged so as to overlap with each other in the axial direction view. More specifically, an optical axis A1 of the light source 21 and an optical axis A2 of the imaging unit 22 overlap with each other on the same axis in the axial direction view. The light source 21 and the imaging unit 22 are arranged on a single virtual line W extending outward in the radial direction from the rotation axis X. For example, when the virtual line W is defined as a line connecting the rotation axis X and a light receiving surface 27a of a charge coupled device (CCD) 27, which are described later, in the radial direction, the light source 21 is disposed on the virtual line W.

The imaging unit 22 is an image sensor including a CCD, for example, and can image the medium S to be read that is placed on the placement surface 2 located under the optical unit 20 in the vertical direction. Specifically, the imaging unit 22 converts light that is reflected by a read image on a reading target line L and incident on the imaging unit 22 into electronic data by photoelectric conversion and produces image data of the read image. The imaging unit 22 includes a reading lens 26 and the CCD 27. The CCD 27 is a line sensor including a plurality of pixels that read an image and are arranged in the main-scanning direction. The CCD 27 is disposed in the optical unit 20 such that the main-scanning direction is parallel to the rotation axis X. The reading lens 26 focuses light reflected from the medium S to be read on the light receiving surface 27a of the CCD 27. Each pixel of the CCD 27 receives light of the read image focused by the reading lens 26 on the light receiving surface 27a and outputs an electrical signal corresponding to the received light. The CCD 27 can read an image on the reading target line L of the medium S to be read and produce line image data in the main-scanning direction. The CCD 27 may be a single-line sensor or a multiple-line sensor.

The light source 21 irradiates an image on the reading target line L of the medium S to be read, i.e., a read image, with light, namely with the slit-light beam. The light source 21 is adjusted such that irradiation light thereof spreads at a predetermined angle with respect to the optical axis A1. The angle is determined such that the width of the irradiation light in the sub-scanning direction on the medium S to be read is a predetermined value. The light source 21 is also adjusted such that irradiation light thereof spreads in the main-scanning direction so as to irradiate the medium S to be read from one end to the other end.

As shown in FIG. 4, the overhead scanner 1 includes a controller 30. The controller 30 is an electronic controller including a computer, for example. The controller 30 has a function of controlling the light source 21, the imaging unit 22, and the driving unit 31 when images are read and a function of moving the optical unit 20 to the standby position when the main body 10 falls down. The controller 30 is coupled to the light source 21, the imaging unit 22, the driving unit 31, and a posture change detecting unit 32 through an input-output interface 33. The controller 30 can be coupled to an external apparatus 40 such as a personal computer (PC) or an information terminal through the input-output interface 33. The overhead scanner 1 can be controlled by the external apparatus 40. For example, the overhead scanner 1 has a function of reading the medium S to be read in response to a reading command from the external apparatus 40 and a function of outputting read image data of the medium S to the external apparatus 40.

The controller 30 controls turning on and off of the light source 21 by adjusting power supplied to the light source 21. The controller 30 may have a function of controlling light emitting amount of the light source 21. The controller 30 turns on the light source 21 so as to irradiate the reading target line L with light when the imaging unit 22 reads images. The controller 30 can drive the imaging unit 22 so as to read the medium S to be read and obtain image data produced by the imaging unit 22.

The controller 30 controls the driving unit 31 so as to swing the optical unit 20 around the rotation axis X. The controller 30 can read a line image on the reading target line L at any position of the reading target line L in the sub-scanning direction on the medium S to be read by adjusting a rotational position of the optical unit 20 around the rotation axis X. The overhead scanner 1 can obtain image data of the whole of the medium S to be read by repeating the acquisition of the line image data and positional adjustment of the reading target line L by rotating the optical unit 20. That is, in the overhead scanner 1, with irradiation light of the light source 21 scans the document surface in the sub-scanning direction and the imaging unit 22 reads an image of the reading target line L irradiated with light. Consequently, the image of the medium S to be read is produced. For example, the overhead scanner 1 produces two-dimensional image data of the medium S to be read by reading a line image of each reading target line L by sequentially shifting the position of the reading target line L is from the back to the front in the length direction.

In the overhead scanner 1 of the embodiment, the imaging unit 22 rotates together with the optical unit 20, and scans and images the medium S to be read while the imaging unit 22 rotates around the rotation axis X on a circumference whose center is the rotation axis X. As a result, variation of an optical path length between the imaging unit 22 and the reading target line L that is a reading target position is reduced.

FIG. 1 depicts the optical unit 20 at a rotational position where the optical unit 20 images the rearmost end of a readable area. The rotational position is one of the positions which the optical unit 20 takes when it rotates around the rotation axis X. Hereinafter, the rotational position of the optical unit 20 where the optical unit 20 images the rearmost end of the readable area is referred to as the "rearmost reading position". The optical unit 20 located at the rearmost reading position can read a side of the medium S to be read, when the side abuts on the front end of the pedestal 11. The rearmost reading position is the rotational position of the optical unit 20 where the optical unit 20 starts reading images.

When the optical unit 20 is located at the rearmost reading position, the main body 23 is located more backward than the axis unit 24. The optical unit 20 located at the rearmost reading position is placed nearly in the horizontal direction extending from the rotation axis X toward the arm 12. Specifically, the optical unit 20 is slightly tilted downward in the vertical direction as the distance from the rotation axis X increases in the radial direction. That is, the main body 23 is in such a tilted posture that an outside portion thereof in the radial direction is located more backward in the sub-scanning direction and more downward in the vertical direction than an inside portion thereof. The rearmost reading position is also the standby position of the optical unit 20. The standby position is a position of the optical unit 20 to which the optical unit 20 is rotated when the imaging unit 22 does not read the medium S to be read. That is, the optical unit 20 is located at the rearmost reading position and stands by until a command to start reading images is issued when the optical unit 20 does not read images. The standby position may differ from the rearmost reading position. For example, the standby position may be a position at which the main body 23 is located more upward in the vertical direction than the rearmost reading position. In other words, the standby position may be a position to which the main body 23 is rotated in an opposite direction of a forward swing direction indicated with an arrow Y1 from the rearmost reading position.

The optical unit 20 located at the rearmost reading position is placed a further backward in relation to a tangent line T to a front end of the pedestal 11 and a front end of the cover 14. In other words, the optical unit 20 located at the standby position is on a side opposite to the placement side in relation to the tangent line T to the pedestal 11 and the cover 14. Consequently, even if the main body 10 falls down when the optical unit 20 is located at the standby position, the optical unit 20 is prevented from direct contact with the placement surface 2. A swing range of the optical unit 20 is determined such that the optical unit 20 is located on the side opposite to the placement side in relation to the tangent line T, when the optical unit 20 is located at least at the standby position. In other words, when the optical unit 20 is located at a front-end reading position, at least a part of the optical unit 20 may be located on the placement side in relation to the tangent line T.

As shown in FIG. 1, the light source 21 and the imaging unit 22 face the placement surface 2 in the respective optical axis directions when the optical unit 20 is located at the position where the optical unit 20 starts reading the medium S to be read. In other words, when the light source 21 and the imaging unit 22 are located at the rearmost reading position, the light source 21 can irradiate the placement surface 2 with light and the imaging unit 22 can read an image of the placement surface 2. As shown in FIG. 1, none of the optical axis A1 of the light source 21 and the optical axis A2 of the imaging unit 22 intersect with the rotation axis X and are located away from the rotation axis X in the axial direction view. When the optical unit 20 is located at the rearmost reading position, the optical axes A1 and A2 are tilted forward as they head for downward in the vertical direction.

When the optical unit 20 starts reading the medium S to be read from the rearmost reading position, the driving unit 31 rotates the optical unit 20 in the forward swing direction Y1. In other words, the driving unit 31 rotates the optical unit 20 so as to move the main body 23 downward in the vertical direction and forward in the sub-scanning direction. Along the rotational direction, the optical unit 20 is moved around the rotation axis X toward the placement side on which the medium S to be read is placed, and the optical unit 20 is also moved around the rotation axis X so as to approach the placement surface 2.

The driving unit 31 moves the optical unit 20 around the rotation axis X in the forward direction Y1, and the reading target position of the imaging unit 22 shifts toward the front. As a result, the medium S to be read can be sequentially read from the back to the front. As the imaging unit 22 moves downward in the vertical direction with the rotation of the optical unit 20, the distance between the imaging unit 22 and the reading target line L in the vertical direction, i.e., a vertical direction component of the optical path length, decreases. On the other hand, as a tilt angle θ1 of the optical axis A2 of the imaging unit 22 with respect to the vertical axis V increases with the rotation of the optical unit 20, the distance between the imaging unit 22 and the reading target line L in the sub-scanning direction, i.e., a sub-scanning direction component of the optical path length, increases. In this way, with the rotation of the optical unit 20, the vertical direction component of the optical path length decreases and the sub-scanning direction component of the optical path length increases, thereby reducing the variation of the optical path length during the scanning of the medium S to be read.

FIG. 3 is a side view of the overhead scanner 1 when the optical unit 20 is located at a rotational position where the optical unit 20 images the front-end in the readable area. Hereinafter, the rotational position of the optical unit 20, where the optical unit 20 images the front-end in the readable area, is referred to as the "front-end reading position". When the optical unit 20 is located at the front-end reading position, the main body 23 is located below the axis unit 24 in the vertical direction. When the optical unit 20 is located at the front-end reading position, the main body 23 is in such a tilted posture that the outside portion thereof in the radial direction is located more backward in the sub-scanning direction and more downward in the vertical direction than the inside portion thereof. At the front-end reading position, the imaging unit 22 and the light source 21 are located more backward than the rotation axis X. The optical axis A2 of the imaging unit 22 is tilted forward as it heads for downward in the vertical direction. The tilt angle θ1 of the optical axis A2 with respect to the vertical axis V when the optical unit 20 is located at the front-end reading position is larger than the tilt angle θ1 when the optical unit 20 is located at the rearmost reading position (refer to FIG. 1).

In the overhead scanner 1 of the embodiment, during the rotation of the optical unit 20 from the rearmost reading position to the front-end reading position, the vertical direction component of the optical path length continues to decrease while the sub-scanning direction component of the optical path length continues to increase with the rotation. That is, the vertical direction component and the sub-scanning direction component of the optical path length consistently continue to vary contrarily to each other in relation to increase and decrease in the optical path length. As a result, a difference between the maximum value and the minimum value of the optical path length between the imaging unit 22 and the medium S to be read decreases. Suppose, the imaging unit 22 reads the medium S to be read of A3 size at a height position of 350 mm. In this case, if the imaging unit 22 is disposed on the rotation axis X, contrary to the embodiment, where position in the vertical direction is fixed, when the imaging unit 22 reads the medium S to be read, the maximum value of the optical path length is 510 mm and the minimum value is 350 mm. As a result, the difference of the optical path length is 160 mm. In contrast, when the imaging unit 22 is disposed in the main body 23 of the optical unit 20 of a pendulum type in accordance with the embodiment, the maximum value of the optical path length can be reduced to about 450 mm, and the difference of the optical path length is reduced to about 100 mm.

Consequently, in the overhead scanner 1 of the embodiment, a depth of field required for imaging the medium to be read can be reduced without elevating the optical unit 20 to a higher height position. Dimensions and angles such as the height position of the optical unit 20, the position of the imaging unit 22 in the radial direction in the optical unit 20, and an intersection angle of the optical axis A2 with respect to the radial direction W connecting the rotation axis X and the light receiving surface 27a of the CCD 27, can be determined appropriately as required. For example, based on given conditions, the dimensions and the angles may be set so as to reduce a variation rate or a variation amount of the optical path length as much as possible during the rotation of the optical unit 20 from the rearmost reading position to the front-end reading position.

When the reading of the medium S to be read is complete, the controller 30 allows the driving unit 31 to move the optical unit 20 to the standby position. The optical unit 20 moved to the standby position is housed at a housed position inside the cover 14 so as to be protected. In this way, the driving unit 31 can move the optical unit 20 to any location within the swing range ranging from the standby position to the front-end reading position by rotating and swinging the optical unit 20 around the rotation axis X.

In the embodiment, the light source 21 is mounted on the optical unit 20. With the rotation of the optical unit 20, the light source 21 irradiates the medium S to be read with light while rotating on the circumference, whose center is the rotation axis X, around the rotation axis X. As a result, the change of the optical path length between the light source 21 and the reading target line L is reduced and an illuminance variation with positions in the sub-scanning direction decreases. In the same manner as the imaging unit 22, the vertical direction component of the optical path length between the light source 21 and the reading target line L decreases while the sub-scanning direction component of the optical path length increases with the rotation of the optical unit 20. Accordingly, the variation of the optical path length between the light source 21 and the reading target line L is reduced when the light source 21 scans the medium S to be read from the back end to the front end. As a result, the illuminance variation with positions in the sub-scanning direction decreases, thereby improving quality of images produced by the overhead scanner 1. In addition, the overhead scanner 1 of the embodiment avoids the height position of the optical unit 20 from being increased. As a result, illuminance of the reading target line L is ensured and image quality of produced images can be improved.

In an overhead scanner that images the medium S to be read that is placed on the placement surface 2 from the upper side in the vertical direction, such as the overhead scanner 1 of the embodiment, the optical unit 20 is disposed above the pedestal 11 in the vertical direction. This structure tends to increase the height of the scanner, and thus there is a possibility of falling down of the scanner. For example, when a person or an object collides with the overhead scanner 1, the main body 10 may lose its balance and fall down. If the main body 10 falls down when the optical unit 20 is located at a readable position where the imaging unit 22 can read the medium S to be read, the optical unit 20 may come into contact with the placement surface 2 and the like. If the reading of the medium S to be read starts or is continued as the main body 10 remains fallen down, an excessive load may be put on the driving unit 31. For the purpose of protecting the elements of the optical unit 20 and the driving unit 31, the optical unit 20 is preferably prevented from coming into contact with the placement surface 2 and the like.

The overhead scanner 1 of the embodiment includes the posture change detecting unit 32 that detects posture change of the main body 10. When the posture change detecting unit 32 detects that the main body 10 falls down while the optical unit 20 is located at the readable position, the optical unit 20 is moved around the rotation axis toward the standby position. As a result, the optical unit 20 is protected when the main body 10 falls down. As shown in FIG. 4, the controller 30 is coupled to the posture change detecting unit 32 through the input-output interface 33. The posture change detecting unit 32 according to the embodiment is a switch that detects the falling down of the main body 10 as explained below. In the following explanation, the posture change detecting unit 32 is also simply referred to as a "switch 32".

As shown in FIG. 1, the switch 32 is disposed on the bottom of the pedestal 11 and protrudes from the bottom surface 11d of the pedestal 11. The switch 32 is urged by urging force such as force generated by a spring in such a direction that it protrudes from the bottom surface 11d. The tip of the switch 32 can protrude from the bottom surface 11d to a position away from the tips of the legs 1ib by the urging force. When the overhead scanner 1 is placed on the placement surface 2, the switch 32 is pushed toward the pedestal 11 by the placement surface 2.

The switch 32 is configured to switch between ON and OFF states depending on whether it abuts on and is pushed by the placement surface 2 or not. For example, the switch 32 is OFF when the switch 32 protrudes beyond the legs 11b by the urging force such as the case that the switch 32 does not abut on the placement surface 2. On the other hand, the switch 32 is ON when the switch 32 abuts on the placement surface 2 and is pushed toward the pedestal 11.

When the overhead scanner 1 is placed on the placement surface 2 as shown in FIG. 1, i.e., the bottom surface 11d of the pedestal 11 is parallel to the placement surface 2, the switch 32 abuts on the placement surface 2 and is pushed toward the pedestal 11 by being pressed by the placement surface 2. In the state, the switch 32 is ON. In the embodiment, the state in which the main body 10 is placed on the placement surface 2 in such a manner that the bottom surface 11d of the pedestal 11 is parallel to the placement surface 2 is referred to as a "horizontal placement state". The controller 30 determines that the main body 10 is in the horizontal placement state, in which the main body 10 is in a stable posture, when the switch 32 is ON. The state in which the main body 10 is in the stable posture means the following states: a state in which each of the legs 1ib of the pedestal 11 properly abuts on the placement surface 2, a state in which the bottom surface 11d is parallel to the placement surface 2, and a state that is not determined that the main body 10 falls down.

Figure 5:
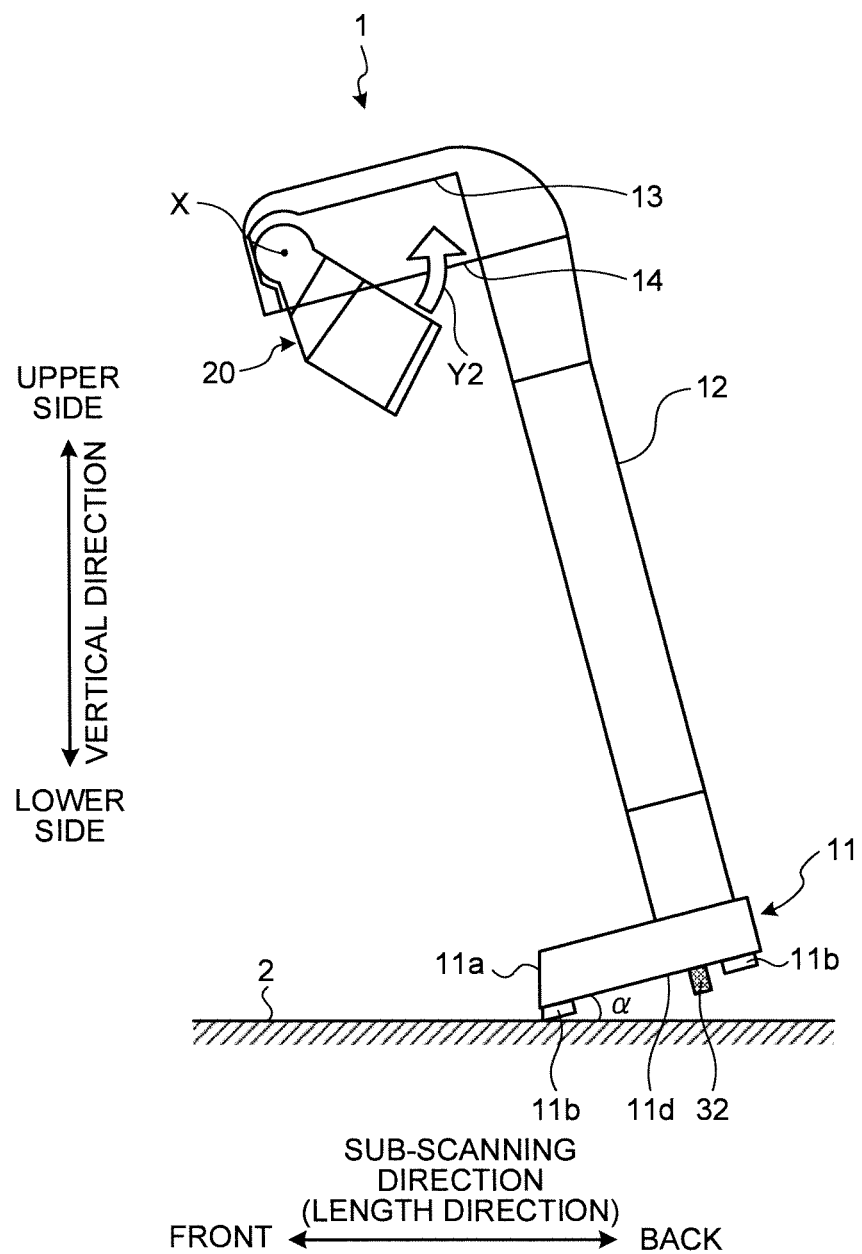
FIG. 5 depicts a state in which a main body is tilted.

FIG. 5 depicts a state in which the main body 10 is tilted. When a person or an object comes into contact with the overhead scanner 1 and the main body 10 is tilted, the switch 32 is switched from ON to OFF. As shown in FIG. 5, when the legs 1ib are lifted from the placement surface 2 as a result of the posture change of the main body 10, pushing force with which the placement surface 2 pushes the switch 32 decreases, and consequently, the switch 32 protrudes. As a result, the switch 32 is switched to the OFF state. The controller 30 determines that the main body 10 falls down when the switch 32 is OFF. The state in which the switch 32 is OFF includes the following states: a state in which at least a part or at least one of the legs 11b of the pedestal 11 is away from the placement surface 2, a state in which the bottom surface 11d is tilted with respect to the placement surface 2, and a state in which the main body 10 lose its balance. The state is determined that the main body 10 falls down or may fall down.

When the controller 30 detects that the switch 32 is OFF, the controller 30 controls the driving unit 31 to move the optical unit 20 around the rotation axis toward the standby position. When the optical unit 20 is thus moved or swung, the rotational direction of the optical unit 20 is a backward swing direction indicated with an arrow Y2 in FIG. 5, i.e., the opposite direction to the forward swing direction Y1 shown in FIG. 1. In other words, when the controller 30 determines that the main body 10 falls down, the controller 30 makes the optical unit 20 move in a direction for housing the optical unit 20 inside the cover 14, i.e., in the direction heading from the front-end reading position to the rearmost reading position by the driving unit 31. As a result, the optical unit 20 is prevented from coming into contact with the placement surface 2 and the like when the main body 10 falls down. Thus, the optical unit 20 is protected.

Figure 6:
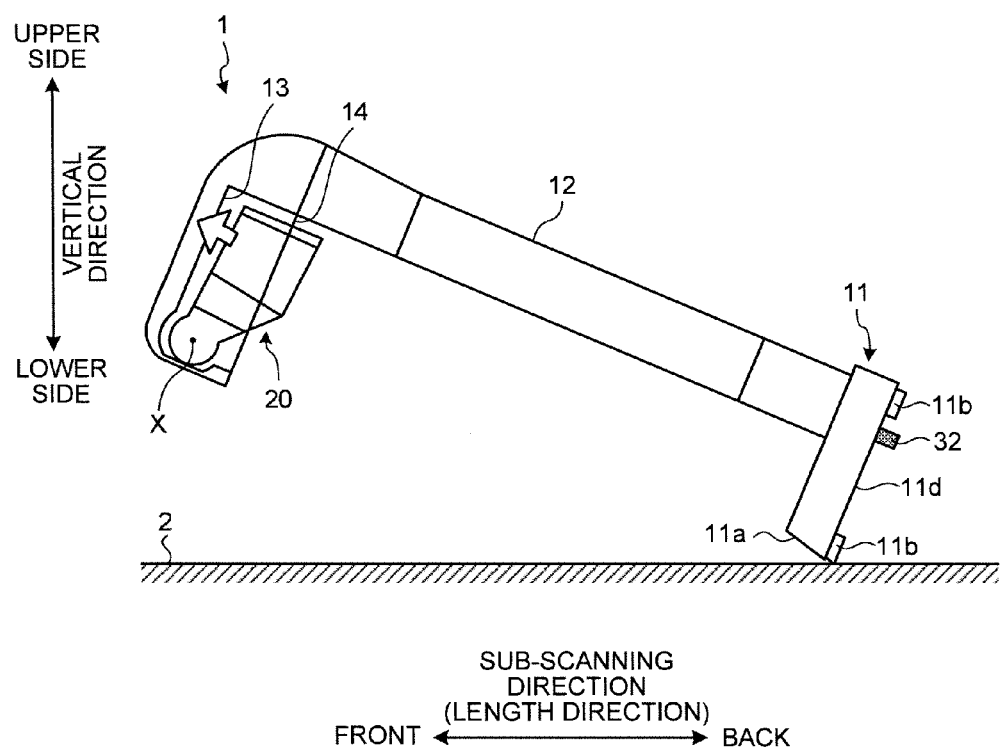
FIG. 6 depicts a state in which an optical unit is moved and reached its standby position in the middle of the falling down of the main body.

FIG. 6 depicts a state in which the optical unit 20 has moved and reached its standby position in the middle of the falling down of the main body 10. When the main body 10 falls down with the optical unit 20 housed at the standby position, the cover 14 hits the placement surface 2 first. Although the optical unit 20 is not returned back to the standby position, the cover 14 hits the placement surface 2 when the main body 10 falls down when the optical unit 20 is located further backward in relation to the tangent line T to the front ends of the pedestal 11 and the cover 14. As a result, the optical unit 20 is prevented from coming into contact with the placement surface 2 and the like. In addition, shock due to the falling down is absorbed by the cover 14, and, as a result, shock applied on the optical unit 20 is damped. In this way, the overhead scanner 1 of the embodiment can protect the optical unit 20 when the overhead scanner 1 falls down.

Figure 7:
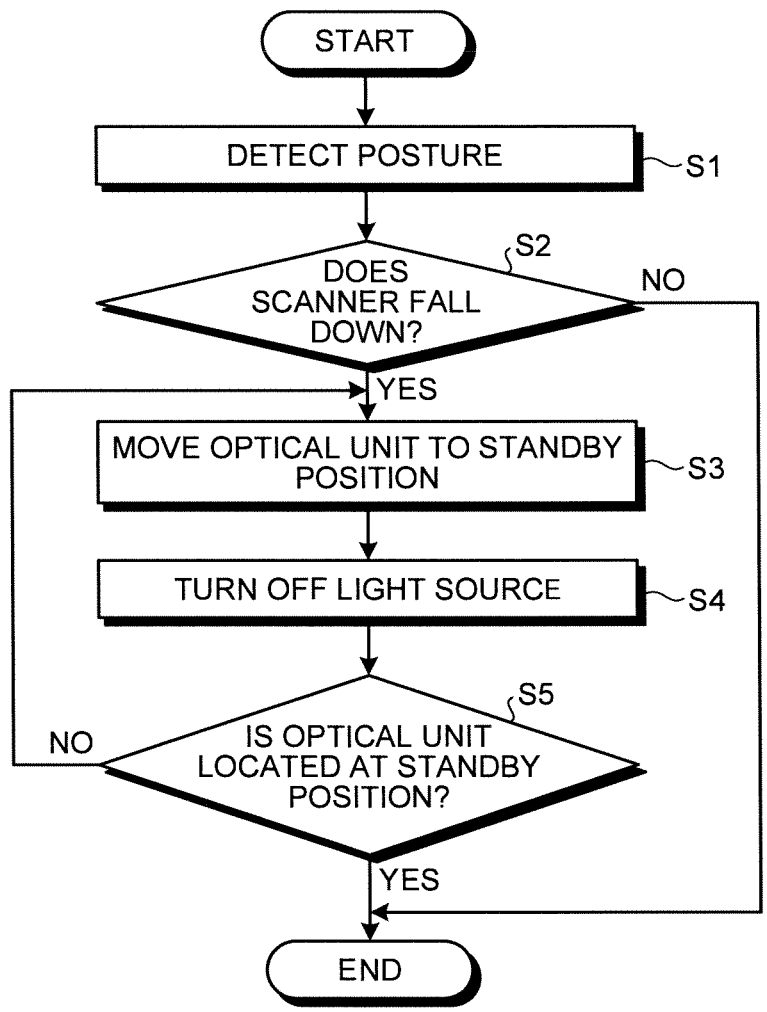
FIG. 7 is a flowchart of operation of the embodiment.

FIG. 7 is a flowchart of operation of the embodiment. The operation of the embodiment is explained with reference to FIG. 7. A control flow shown in FIG. 7 is executed when the optical unit 20 is located at the readable position, such as when the imaging unit 22 images the medium S to be read, and can be repeatedly executed at specified intervals.

At step S1, the controller 30 detects a posture of the main body 10. The controller 30 detects the state (ON or OFF) of the switch 32 serving as the posture change detecting unit. The detection result of the switch 32 represents the posture change of the main body 10. For example, when the state of the switch 32 is changed from ON to OFF, the change represents that the posture of the main body 10 is changed from the horizontal placement state to a tilted state. When the state of the switch 32 is changed from OFF to ON, the change represents that the posture of the main body 10 is changed from an unstable state (the tilted state) to the horizontal placement state. When the switch 32 remains OFF, the state represents that the main body 10 remains tilted as being in the unstable state or the main body 10 is being further tilted and will fall down. After step S1 is executed, the control flow proceeds to step S2.

At step S2, the controller 30 determines whether the main body 10 falls down. The controller 30 executes the determination at step S2 based on the detection result of the switch 32. For example, the controller 30 determines that the main body 10 falls down when it is detected that the switch 32 is OFF or when it is determined that the state of the switch 32 is changed from ON to OFF. If it is determined that the main body 10 falls down at step S2 (YES at step S2), the control flow proceeds to step S3. If it is determined that the main body 10 does not fall down at step S2 (NO at step S2), the control flow ends.

At step S3, the optical unit 20 is moved toward the standby position under the control of the controller 30. The controller 30 controls the driving unit 31 to move the optical unit 20 around the rotation axis toward the standby position. A rotational speed to rotate the optical unit 20 toward the standby position may be fast as much as possible within the capacity of the driving unit 31. For example, the rotational speed to evacuate the optical unit 20 to the standby position when it is determined that the main body 10 falls down is preferably faster than that to move the optical unit 20 to the standby position when it is not determined that the main body 10 falls down. The rotational speed to evacuate the optical unit 20 to the standby position when it is determined that the main body 10 falls down may be a capacity speed or a maximum speed of the driving unit 31 to rotate the optical unit 20. After step S3 is executed, the control flow proceeds to step S4.

At step S4, the controller 30 turns off the light source 21. The controller 30 stops supplying power to the light source 21 so as to turn off the light source 21. The turning off of the light source 21 can increase electrical energy or electric power supplied to the driving unit 31. For example, the rotational speed of the optical unit 20 can be increased by increasing a driving current of the motor included in the driving unit 31. At step S4, the supply of power to the imaging unit 22 may be also stopped in addition to the light source 21. Further, the supply of power to all of the elements of the optical unit 20 may be stopped. After step S4 is executed, the control flow proceeds to step S5.

At step S5, the controller 30 determines whether the optical unit 20 is located at the standby position. For example, the controller 30 can determine whether the optical unit 20 is located at the standby position based on a detection result of an encoder capable of detecting rotational movement of the optical unit 20. The determination is not limited to be done in this manner. The determination at step S5 may be done based on a detection result of a switch capable of detecting that the optical unit 20 is located at the standby position. When it is determined that the optical unit 20 is located at the standby position at step S5 (YES at step S5), the control flow ends. When it is determined that the optical unit 20 is not located at the standby position at step S5 (NO at step S5), the control flow proceeds to step S3.

The switching between ON and OFF states of the switch 32 is preferably made in the tilted state of the main body 10, which leads the main body 10 to fall down. As explained with reference to FIG. 5 as an example, when the main body 10 is tilted forward, and an angle made between the bottom surface 11d and the placement surface 2, i.e., a tilt angle a of the main body 10, exceeds a threshold, the main body 10 falls down. On the other hand, when the tilt angle α of the main body 10 is less than the threshold, the main body 10 does not fall down and recovers to the horizontal placement state. In this case, the switching position is preferably determined in such a manner that the switch 32 is ON when the tilt angle α is less than the threshold while the switch 32 is OFF when the tilt angle α exceeds the threshold.

The posture change detecting unit 32 is not limited to the switch 32. Examples of the posture change detecting unit 32 may include an acceleration sensor, and a pressure switch. For example, when the overhead scanner 1 includes an acceleration sensor as the posture change detecting unit 32, determination of whether the main body 10 falls down may be done based on acceleration in at least one of the main-scanning direction, the sub-scanning direction, and the vertical direction of the main body 10. The acceleration sensor may be disposed on the upper portion of the main body 10, such as the cover 14, or the lower portion of the main body 10, such as the pedestal 11. It can be determined that the main body 10 falls down when acceleration equal to or larger than specified acceleration is detected by the acceleration sensor.

A pressure switch may be used as the posture change detecting unit 32. For example, the pressure switch is disposed on the bottom of the legs 11b of the pedestal 11 and detects pressure when the main body 10 is placed on the placement surface 2. The posture change of the main body 10, such as a tilt, can be detected based on the decrease of the pressure detected by the pressure switch. For example, the controller 30 may determine that the main body 10 falls down when the pressure detected by the pressure switch decreases, when the detected pressure drop continues for a predetermined period of time, or when the decrease level of the detected pressure is large.

It may be determined whether the main body 10 falls down based on image data read by the imaging unit 22. For example, if a mark, such as a slit or a line, based on which the current reading position can be determined, is provided on the placement surface 2, the posture change of the main body 10 can be detected based on the produced images.

In the embodiment, the light source 21 is mounted on the optical unit 20. However, the light source 21 is not limited to be disposed in this manner. The light source 21 may be disposed on the main body 10 so as to be isolated from the optical unit 20. In this case, by turning off the light source 21 when it is determined that the main body 10 falls down, a person around the overhead scanner 1 can be prevented from feeling being dazzled due to irradiation light from the light source 21.

The arrangement of the rotation axis X and the optical unit 20 on the main body 10, the driving method of the driving unit 31, and the detection method of the posture change detecting unit 32 are not limited to those exemplified in the embodiment, and they can be properly determined as needed.

First Modification Example of Embodiment

Figure 8:
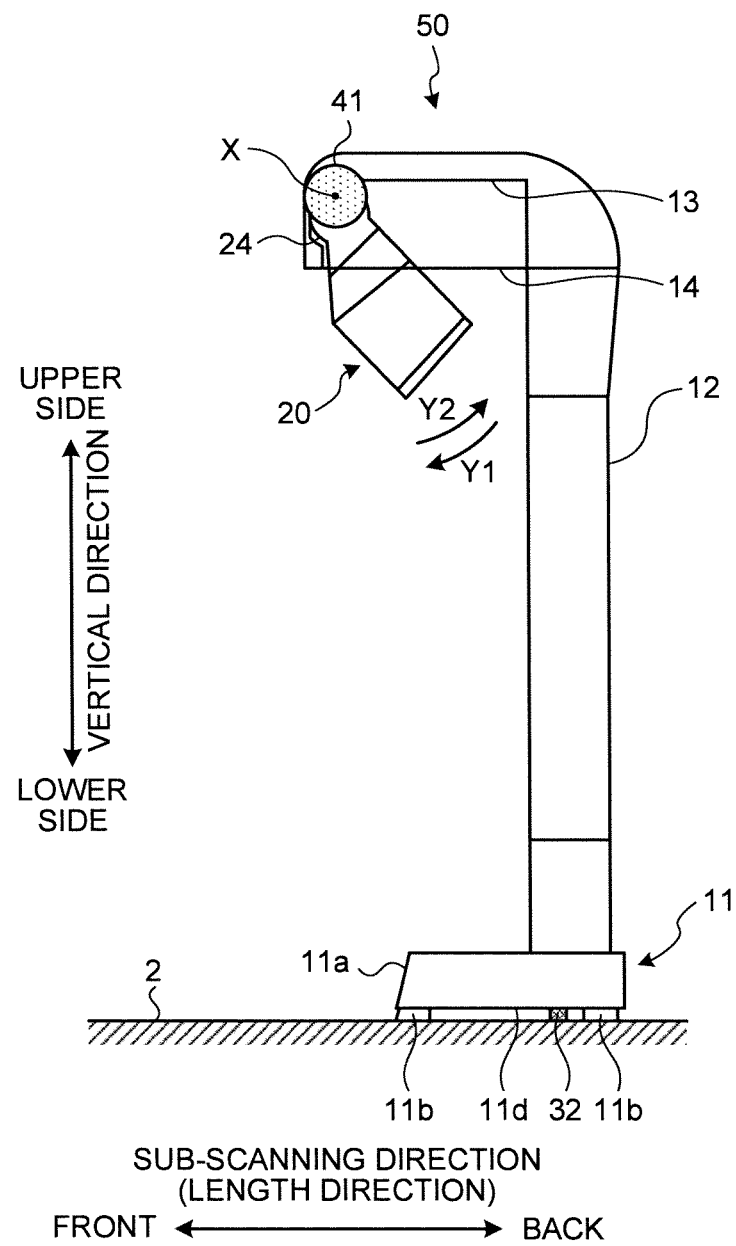
FIG. 8 is a side view of an overhead scanner according to a first modification example of the embodiment.
Figure 9:
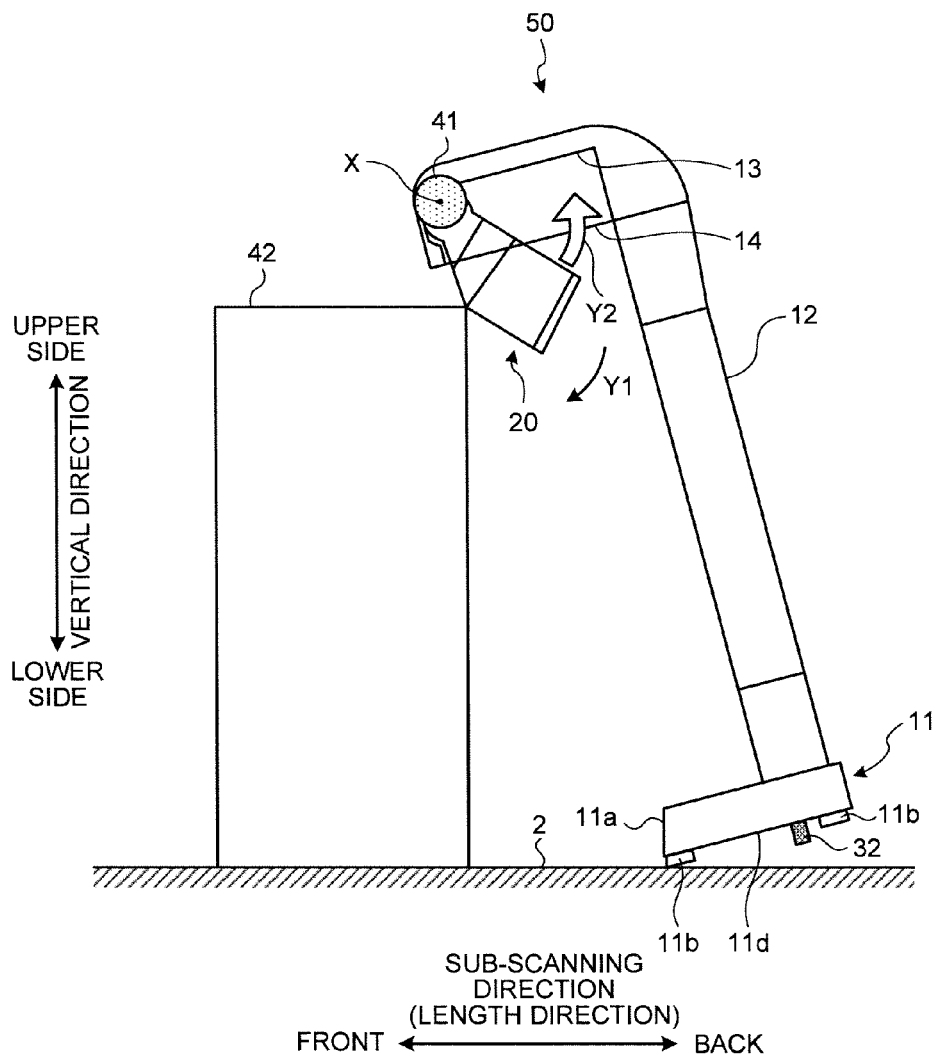
FIG. 9 is a schematic for explaining operation of the overhead scanner according to the first modification example.

A first modification example of the embodiment is explained. The overhead scanner 1 of the embodiment may further include a torque limiter. FIG. 8 is a side view of an overhead scanner 50 according to the first modification example of the embodiment. FIG. 9 is a schematic for explaining operation of the overhead scanner 50 according to the first modification example.

As shown in FIG. 8, the overhead scanner 50 includes a torque limiter 41. The torque limiter 41 is interposed between the driving unit 31 and the optical unit 20. That is, the torque limiter 41 is disposed in a transmission path of driving force by which the driving unit 31 drives and rotates the optical unit 20. The torque limiter 41, which is disposed on the axis unit 24 of the optical unit 20, for example, transmits torque output by the motor serving as a driving source of the driving unit 31 to the axis unit 24. The torque limiter 41 slips when transmission torque exceeds predetermined torque so as not to transmit torque exceeding the predetermined torque. The torque limiter 41 may be capable of limiting torque transmission in one direction of rotation or capable of limiting torque transmission in both directions of rotation.

For example, the torque limiter 41 capable of limiting the transmission of excessive torque in both rotational directions can limit both of an overload produced when the optical unit 20 is moved in the forward swing direction Y1 heading from the standby position to the front-end reading position and an overload produced when the optical unit 20 is moved in the backward swing direction Y2 heading from the front-end reading position to the standby position. As a result, since excessive force and torque are prevented from being applied to the optical unit 20 when the optical unit 20 comes into contact with an obstacle or a user who mistakenly touches the optical unit 20, the optical unit 20 is protected. The torque limiter 41 can limit overload of the driving unit 31 and protect the driving unit 31.

According to the first modification example, as explained with reference to FIG. 9, the optical unit 20 and the driving unit 31 are protected before detection of the falling down. FIG. 9 depicts a state in which the optical unit 20 comes into contact with an obstacle 42 when the overhead scanner 50 tilts forward in the course of falling down, and before determining the falling down based on the state of the posture change detecting unit 32. When the optical unit 20 comes into contact with the obstacle 42 before the optical unit 20 is moved toward the standby position after the determination of the falling down is made, excessive torque may be applied on the transmission path of driving force from the driving unit 31 to the optical unit 20 due to acceleration of the falling down and the weight of the overhead scanner 50. When a user touches the optical unit 20, excessive torque may be applied in the same manner as described above. For example, if a user touches the optical unit 20 so as to receive the main body 10 falling down, excessive torque may be applied on the transmission path of the driving force. In contrast, in the overhead scanner 50 of the modification example, the torque limiter 41 operates and limits the transmission of excessive torque. As a result, the optical unit 20 and the driving unit 31 are protected.

The torque limiter 41 can limit overload produced in the transmission path of the driving force from the driving unit 31 to the optical unit 20 not only when the overhead scanner 50 falls down. When improving accuracy in controlling the swing of the optical unit 20, it is advantageous to increase a reduction ratio of speed of the optical unit 20 to speed of the driving source of the driving unit 31. In this case, however, the load of the driving unit 31 tends to be excessive when excessive torque is applied on the optical unit 20 due to external force. The overhead scanner 50 of the first modification example can effectively limit overload of the driving unit 31 when the reduction ratio of the driving unit 31 is increased. As a result, the driving unit 31 is protected from the overload.

When the torque limiter 41 continues to slip due to a contact of the optical unit 20 with the obstacle 42 while the imaging unit 22 reads the medium S to be read, the imaging unit 22 repeats the reading of the same reading target line L. In this case, based on image data produced by the imaging unit 22, the controller 30 may determine the state as occurrence of abnormality where the torque transmission between the driving unit 31 and the optical unit 20 is limited by the torque limiter 41. That is, the imaging unit 22 can function as a torque limit detecting unit that detects that the torque transmission is limited by the torque limiter 41. In addition, when determining the occurrence of abnormality, the controller 30 may stop the operation of the driving unit 31, control the driving unit 31 to move the optical unit 20 in the opposite direction to the current moving direction, or provide an alert to a user of the detection of the abnormality. Furthermore, when determining the occurrence of abnormality, the controller 30 may stop supplying power to the optical unit 20.

The means for detecting the torque transmission limitation by the torque limiter 41 is not limited to one that limits the torque based on the image data produced by the imaging unit 22. For example, the overhead scanner 50 may include a rotational direction detecting unit that detects a rotational direction of the optical unit 20 and the controller 30 may determine abnormality based on a detection result that the optical unit 20 rotates in the opposite direction to a rotational direction in which the optical unit 20 is rotated by torque generated by the driving unit 31. For example, although the driving unit 31 operates so as to move the optical unit 20 in the forward swing direction Y1, if the actual moving direction of the optical unit 20 is the backward swing direction Y2, it can be determined that the torque transmission is limited. The rotational direction and rotational amount of the optical unit 20 can be detected by an encoder which serves as the rotational direction detecting unit, for example.

The overhead scanner 50 may include a driving current detecting unit that detects the driving current value of the motor included in the driving unit 31 and the controller 30 may determine abnormality based on a driving current value of the driving unit 31 detected. It can be determined whether the torque limiter 41 limits the torque transmission based on a detection result of a detecting unit.

Second Modification Example of Embodiment

Figure 10:
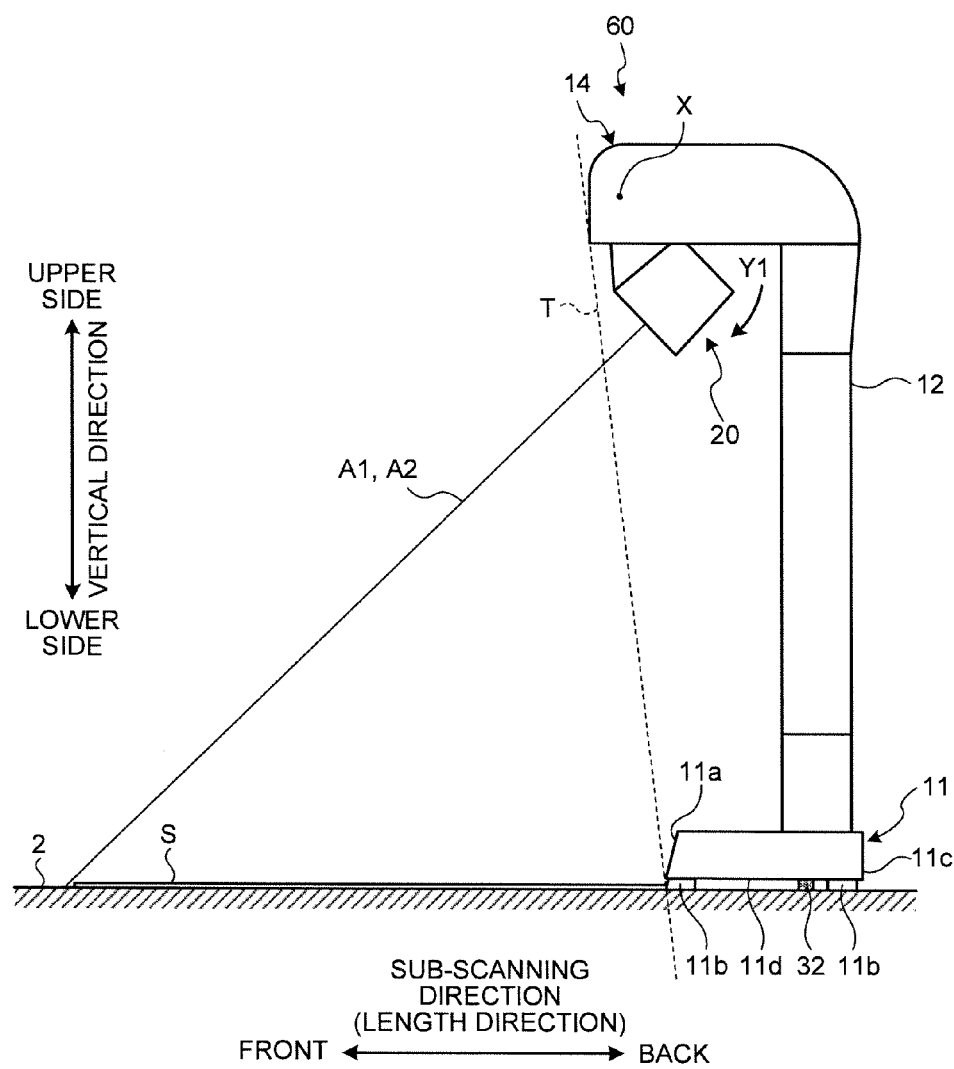
FIG. 10 is a side view of an overhead scanner according to a second modification example of the embodiment.

A second modification example of the embodiment is explained. FIG. 10 is a side view of an overhead scanner 60 according to the second modification example. In the overhead scanner 60, the swing range of the optical unit 20 is determined so as to prevent the optical unit 20 from coming into direct contact with the placement surface 2 when the overhead scanner 60 falls down. Specifically, the optical unit 20 is located backward from the tangent line T to the pedestal 11 and the cover 14 on the front side when the optical unit 20 is at a swing limit in the forward swing direction Y1. As a result, the overhead scanner 60 according to the second modification example can improve performance for protecting the optical unit 20.

FIG. 10 depicts the overhead scanner 60 when the optical unit 20 is located at the front-end reading position. The front-end reading position is a position of the swing limit position when the optical unit 20 is moved in the forward swing direction Y1 from the standby position. The optical unit 20 located at the swing limit position is behind the tangent line T contacting the front edges of the cover 14 and the pedestal 11. In other words, the optical unit 20 at the swing limit is located on a side opposite to the placement side in relation to the tangent line T of the pedestal 11 and the cover 14 on the placement side and behind the tangent line T.

This structure prevents the optical unit 20 from coming into direct contact with the placement surface 2 even if the optical unit 20, which remains located at the swing limit position, tilts forward and then falls down. In this way, in the overhead scanner 60 of the embodiment, the driving unit 31 makes the optical unit 20 move to the standby position when the main body 10 falls down, and the driving unit 31 makes the optical unit 20 swing within a range capable of preventing the optical unit 20 from coming into contact with the placement surface 2 when the main body 10 falls down. As a result, the overhead scanner 60 of the embodiment can properly protect the optical unit 20 and the driving unit 31.

Third Modification Example of Embodiment

Figure 11:
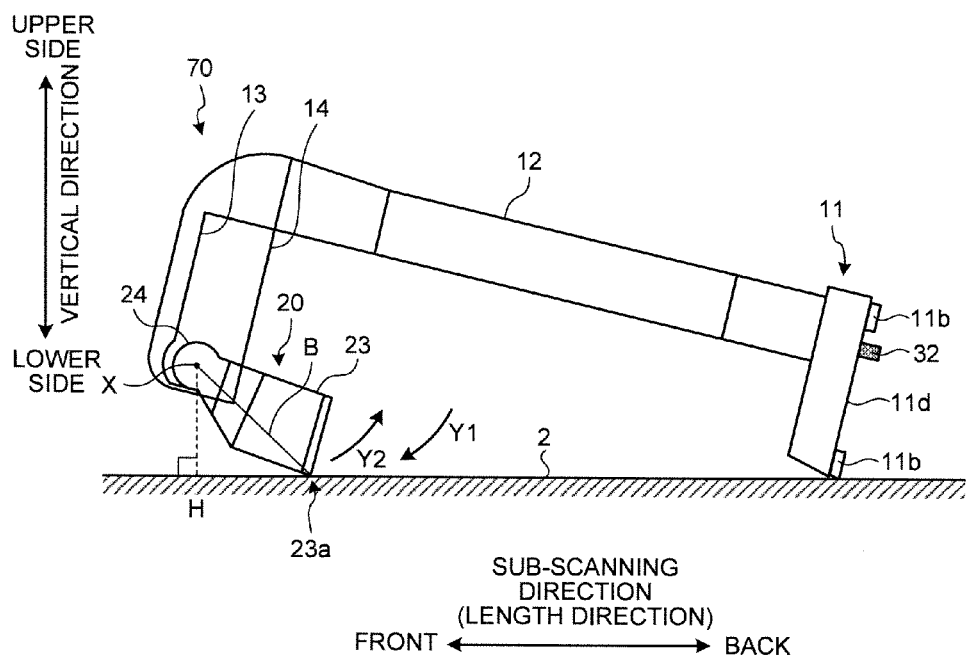
FIG. 11 is a side view of an overhead scanner according to a third modification example of the embodiment.

A third modification example of the embodiment is explained. FIG. 11 is a side view of an overhead scanner 70 according to the third modification example. In the overhead scanner 70 according to the third modification example, the swing limit position is determined such that force in the backward swing direction Y2 acts on the optical unit 20 when the optical unit 20 comes into contact with the placement surface 2 due to the falling down of the overhead scanner 70. As a result, the optical unit 20 is prevented from being rotated beyond the swing limit position and the optical unit 20 is protected.

FIG. 11 depicts a state in which the overhead scanner 70 falls down and the optical unit 20 at the swing limit position comes into contact with the placement surface 2. In FIG. 11, an end 23*a*, in the forward swing direction Y1, of the main body 23 of the optical unit 20 abuts on the placement surface 2 when the overhead scanner 70 falls down. In this state, a radial direction B connecting the rotation axis X and the end 23*a* is tilted backward as it approaches downward in the vertical direction. In other words, the position at which the end 23*a* abuts on the placement surface 2 is on a side close to the pedestal 11 in relation to a perpendicular line H extending from the rotation axis X to the placement surface 2.

As a result, force in the backward swing direction Y2 acts on the optical unit 20. The force in the backward swing direction Y2 prevents the force in the forward swing direction Y1 from further acting on the optical unit 20 at the swing limit position, so that the optical unit 20 and the driving unit 31 are protected. When the driving unit 31 moves the optical unit 20 toward the standby position after determination of falling down, a direction of torque applied on the optical unit 20 by the driving unit 31 coincides with a direction of torque applied on the optical unit 20 due to force applied from the placement surface 2. As a result, the load of the driving unit 31 is reduced.

The contents disclosed in the embodiment and the modification examples can be properly combined in implementation of the invention.

An overhead scanner according to the invention includes a rotation unit supported on a main body so as to be rotatable around a rotation axis, an imaging unit that is mounted on the rotation unit and reads a medium to be read that is placed on a placement surface located under the rotation unit in the vertical direction, a light source that irradiates the medium to be read with light, a driving unit that moves the rotation unit around the rotation axis, and a posture change detecting unit that detects posture change of the main body. The driving unit moves the rotation unit around the rotation axis to a placement side on which the medium to be read is placed from a standby position where the rotation unit is located when the imaging unit does not read the medium to be read.

In the overhead scanner according to the invention, when determining that the main body falls down based on the posture change of the main body while the rotation unit is located at a readable position where the imaging unit can read the medium to be read, the driving unit moves the rotation unit around the rotation axis toward the standby position. As a result, the overhead scanner according to the invention can protect the optical system when the overhead scanner falls down.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead scanner, comprising:
a main body;
a rotation unit supported by the main body so as to be rotatable around a rotation axis;
an imaging unit that is mounted on the rotation unit and is configured to read a medium to be read that is placed on a placement surface located below the rotation unit in a vertical direction;
a light source that irradiates the medium to be read with light;
a driving unit that moves the rotation unit around the rotation axis in a direction toward a placement side, on which the medium to be read is placed; and
a posture change detecting unit that detects posture change of the main body, wherein
a standby position where the rotation unit is located when the imaging unit does not read the medium to be read is located in an opposite direction to the direction toward the placement side, and
while the rotation unit is located at a readable position where the imaging unit is capable of reading the medium to be read, the driving unit moves the rotation unit around the rotation axis toward the standby position when it is determined that the main body falls down based on the posture change of the main body.

2. The overhead scanner according to claim 1, wherein the light source is mounted on the rotation unit.

3. The overhead scanner according to claim 1, wherein the light source is turned off when it is determined that the main body falls down based on the posture change of the main body while the rotation unit is located at the readable position.

4. The overhead scanner according to claim 1, wherein a torque limiter is interposed between the rotation unit and the driving unit.

5. The overhead scanner according to claim 4, further comprising a torque limit detecting unit that detects that torque transmission between the driving unit and the rotation unit is limited by the torque limiter, wherein operation of the driving unit is stopped when limitation of the torque transmission is detected.

6. The overhead scanner according to claim 1, wherein
the main body includes a pedestal to be placed on the placement surface and a cover that is disposed above the pedestal in the vertical direction and is connected to the pedestal, and that covers the rotation axis, and
the rotation unit at a swing limit is located on an opposite side of the placement side in relation to a tangent line of the pedestal and the cover on the placement side.

* * * * *